United States Patent [19]

Hanagan

[11] 4,095,820
[45] Jun. 20, 1978

[54] SEAT ASSEMBLY FOR A CYCLE
[75] Inventor: Michael W. Hanagan, Somers, Conn.
[73] Assignee: Corbin Gentry, Inc., Somersville, Conn.
[21] Appl. No.: 735,073
[22] Filed: Oct. 22, 1976
[51] Int. Cl.² .............................. B62J 1/08; B62J 7/04
[52] U.S. Cl. .............................. 280/289 A; 280/289 R; 296/63; 297/195
[58] Field of Search ...................... 280/289 R, 289 A; 296/63, 65 A, 78.1; 297/195, 243, DIG. 9; D. 6/48.1; D. 12/119

[56] References Cited
U.S. PATENT DOCUMENTS

| D. 238,987 | 3/1976 | Hanagan | D. 6/48.1 |
| 3,269,773 | 8/1966 | O'Connor | 297/214 |
| 3,741,596 | 6/1973 | Cate | 297/195 |
| 3,758,153 | 9/1973 | Bonikowsky | 297/199 |
| 3,850,353 | 11/1974 | Foulds | 297/DIG. 9 |
| 3,927,727 | 12/1975 | Hanagan | 280/289 X |

Primary Examiner—Joseph F. Peters, Jr.
Assistant Examiner—Donn McGiehan

[57] ABSTRACT

A seat assembly for mounting on a cycle includes a structurally stiffened saddle having a horizontally extending base and a vertically extending back. Hinge means are provided adjacent one longitudinal side of the saddle base and latching means are provided adjacent the opposite longitudinal side of the saddle base to enable the seat assembly to be mounted on the frame of a cycle, such as a motorcycle, for pivoting about a longitudinal axis of the seat assembly between a latched and unlatched position. A frame having a safety bar portion and a luggage rack diverging from the safety bar portion is rigidly affixed to the back of the saddle. The frame member is dimensioned so that it does not interfere with the pivoting movement of the seat assembly between its latched and unlatched positions. A foamed polyurethane seating pad has an outer cover thereon and is mounted on the saddle to provide a base cushion and back cushion. A design is sculpted into the outer surface of the seating pad and the outer cover is conformed to the sculpted design.

11 Claims, 8 Drawing Figures

SEAT ASSEMBLY FOR A CYCLE

BACKGROUND OF THE INVENTION

The present invention concerns seat assemblies for cycles, more particularly, seat assemblies adapted to be mounted on the frame of a motorcycle and provide a seat and support for the operator and, optionally, a passenger.

Cycle seats which provide a padded seating pad and back rest supported on a structural frame or base are known, as shown for example in U.S. Pat. No. 3,269,773. This patent also shows a tiered seat of such construction providing a first seat for the cycle operator and a second seat for a passenger.

The provision of safety bars on such seat assemblies is also known as illustrated by U.S. Pat. No. 3,741,596. This latter patent also illustrates the provision of an outer wear covering over the seat pad as well as the provision of a pattern design worked into the seat cover for decorative purposes.

U.S. Pat. No. 3,586,369 shows a cycle in which a top layer of a quilting material is heat-sealed in a die to provide a quilted appearance to the outer quilting layer to provide a seat having a quilted or tufted design effect. U.S. Pat. No. D. 238,988, assigned to the assignee of the present application, also shows a design worked into the outer covering of a cycle seat.

Finally, U.S. Pat. No. 3,927,727, assigned to the assignee of the present application, shows a seat and fairing assembly which is provided with hinges and latching means so that the assembly may be pivoted about its longitudinal axis between a lowered locked position and a raised unlocked position on the frame of the cycle to which the seat assembly is attached.

The feature of a pivotable seat is convenient since it provides access to the components of the cycle, such as the battery and other electrical system components, normally hidden by the seat, without the necessity of dismantling and subsequently replacing the seat. The removal and subsequent replacement of conventional fastening means such as nuts, bolts, etc. is obviously more complicated and time consuming than the simple unlatching and pivoting of a hinged seat and subsequent closing and relatching thereof.

One difficulty with prior art design has been that the feature of a pivotable seat, while highly convenient, has the drawback that it precludes the utilization of a safety bar and accessories such as luggage racks since the latter structures would normally interfere with the pivoting movement of the seat assembly. Thus, with prior art design it was necessary to either forego the convenient pivotable seat feature on the one hand, or the safety bar and/or luggage rack features on the other.

Another difficulty with prior art assemblies is the difficulty and complexity of added steps of manufacture necessary to provide a sculpted design in the seating pad.

It is accordingly an object of the present invention to provide a novel seat assembly design which includes a safety bar and luggage rack which is nonetheless freely pivotably moveable between a lowered locked position on the cycle frame and a raised unlocked position.

It is another object of the present invention to provide a seat assembly for a cycle which provides a seating cushion and a back cushion supported on a structural saddle with a safety bar and luggage rack affixed to the seat assembly and so dimensioned as not to interfere with pivoting movement of said seat assembly about its longitudinal axis on the frame of the cycle to which it is affixed.

It is another object of the present invention to provide a seat assembly for mounting on a cycle which seat assembly includes a seating pad having a sculpted design outer surface and an outer covering thereover which is conformed to the sculpted design.

Other objects and advantages of the present invention will become apparent from a consideration of the following description thereof.

SUMMARY OF THE INVENTION

A seat assembly for mounting on a cycle frame comprises a structural saddle which has a horizontally extending base and a vertically extending back. An upper surface of the base defines a seat platform and a leading surface of the back defines a back rest platform. A trailing surface of the back defines a mounting platform. Stiffener means is secured to both the base and the back of the saddle to effect reinforcement thereof. Hinge means are mounted on the saddle on one side of the longitudinal center line thereof. Retaining means are mounted on the saddle to the opposite of the longitudinal center line from the hinge means, the hinge means and the latching means cooperating to enable the saddle to be pivoted for movement between a locked lowered position and an unlocked raised position on the cycle frame. A frame member has a vertically extending safety bar portion with a luggage rack extending rearwardly from the safety bar portion. Means to rigidly affix the frame member to the structural saddle are provided so that the safety bar portion extends adjacent to the mounting platform of the back of the saddle for at least a portion of the length thereof. The luggage rack extends rearwardly from the mounting platform and the frame member is dimensioned so as to provide clearance for the movement of the seat assembly between its lowered and raised positions. The seating pad is configured so as to be mounted on the saddle, the seating pad having an upper surface and comprising a base cushion and a back cushion. The seating pad is affixed to the saddle with the base cushion supported on the seating platform and the back cushion on the back rest platform.

Certain objects of the invention are attained by providing the seating pad as a foamed material, with the outer surface of the seating pad having a sculpted design formed in the foamed material thereof. A flexible outer covering is affixed over the seating pad so that the cover conforms to the sculpted design in the seating pad. The flexible outer covering may preferably be a composite material comprising an outer wear surface fabric, a backing cloth, and a thin foamed material pad sandwiched between the fabric and the packing cloth.

Other objectives of the invention are attained by providing a structure wherein the safety bar portion of the frame member has a top which extends above the back of the saddle and the luggage rack extends from a portion of the frame member remote from the top and is positioned above the lowermost portion of the saddle. A fairing member may be affixed to the saddle, more specifically, the fairing member may be affixed to the base of said saddle so as to effectively provide a rearwardly extending projection thereof.

DESCRIPTION OF THE PREFERRED EMBODIMENTS

Figure 1:
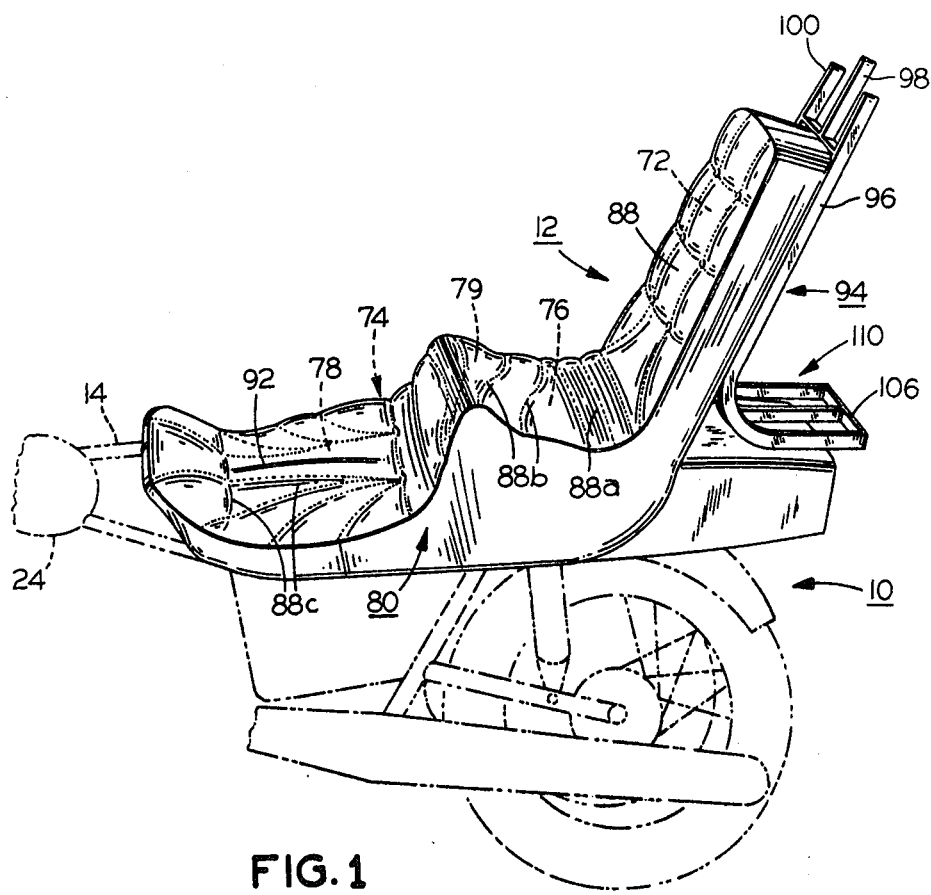
FIG. 1 is a perspective view of an embodiment of a seat assembly in accordance with the present invention, illustrating the assembly mounted in the locked lowered position on a motorcycle, the latter being depicted in partial view by means of broken lines.

Referring to FIG. 1, a motorcycle generally indicated at 10 is shown in partial view in dotted outline and has mounted thereon a seat assembly in accordance with the invention generally indicated at 12. Motorcycle 10 includes a frame 14, shown in full line view in FIG. 2. Frame 14 is of rigid tubular construction and has a circular return bent portion generally indicated at 16 in FIG. 2 and a pair of substantially parallel longitudinal legs 18, 20. Each of the longitudinal legs are bent to define a V-shaped yoke end generally indicated at 22 formed by the short bent legs each of which is connected to yoke 24 shown in dotted outline in FIGS. 1 and 2. Yoke 24 supports the yoke end 22 of frame 14, and the other end of frame 14 is supported by support members 26 shown in dotted outline in FIG. 2. It is conventional construction to provide such a frame member secured to the motorcycle in order to receive and support a seat assembly.

Figures 2, 3, 3A:
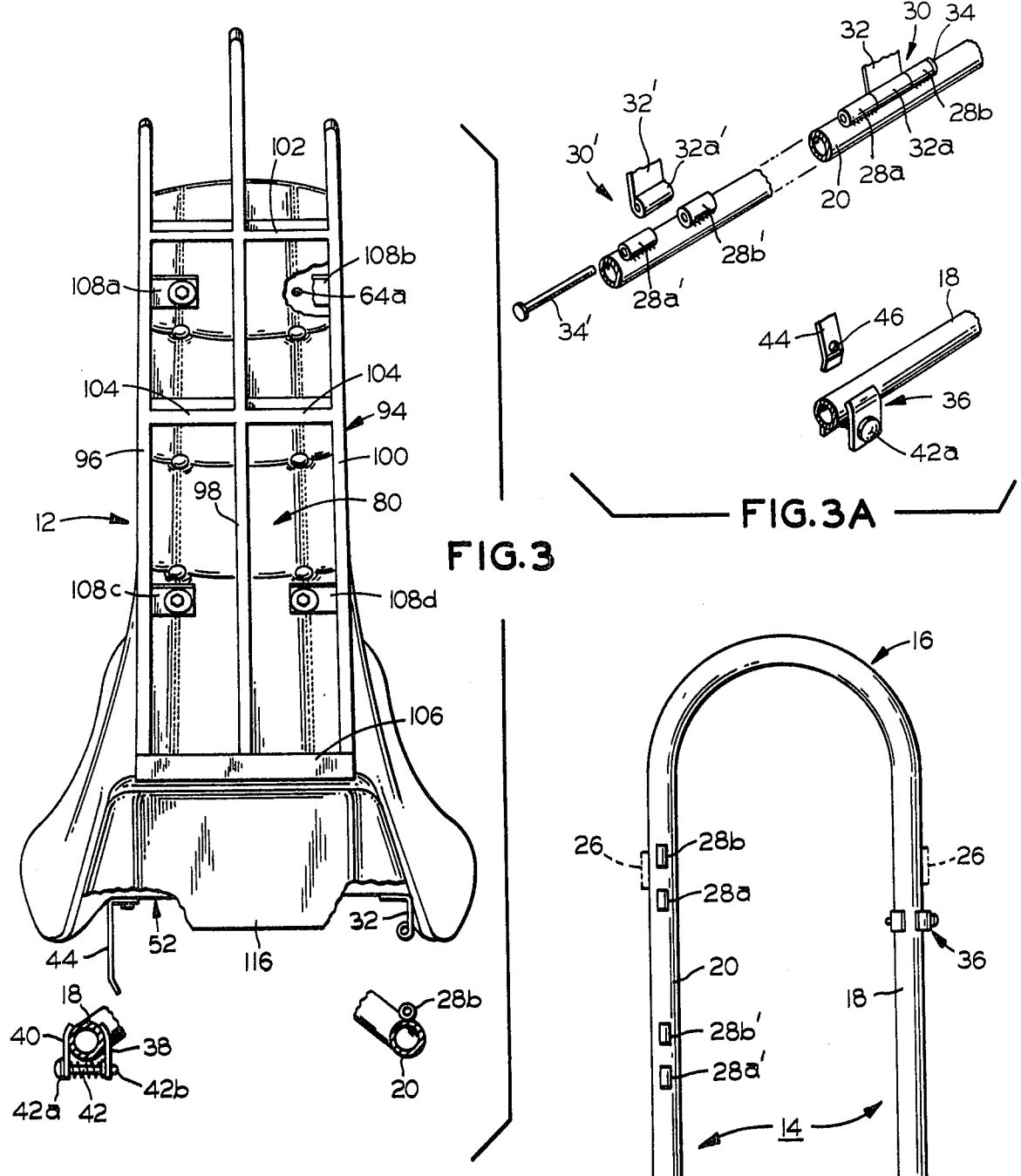
FIG. 2 is a top plan view of that portion of the frame of the motorcycle on which a seat assembly constructed in accordance with the present invention is pivotably mounted.
FIG. 3 is a partially broken away view of the seat assembly of FIG. 1.
FIG. 3A is a fragmentary view showing the relationship between the retaining means of the seat assembly and the latching means of the frame of FIG. 3.

Frame 14 has mounted on the top of longitudinal leg 20 thereof fixed hinge members 28A, 28B which are a part of hinge means assembly 30, generally indicated in FIG. 3A. Hinge means assembly 30, and identical hinge means assembly 30' (shown in exploded view in FIG. 3A) will be described herein below. Identical fixed hinge members 28A' and 28B' are also mounted on leg 20 spaced from members 28A and 28B towards return bent portion 16.

The opposite longitudinal leg 18 of frame 14 has provided thereon, generally opposite fixed hinge members 28A, 28B and 28A', 28B', latching means generally indicated at 36. Latching means 36 includes a pair of opposed members 38, 40 which are respectively attached to opposite sides (as viewed in the lowermost portion of FIG. 3) of leg 18 by any suitable means such as welding, etc. Adjacent the lower ends of members 38, 40 are respectively provided holes dimensioned to receive therewithin in sliding fit a latching pin 42 which has an enlarged head portion 42A. A coil spring (unnumbered in FIG. 3) is captured on the shaft of latching pin 42 between members 38, 40. A washer (unnumbered in FIG. 3) is affixed to the shaft of latching pin 42 interiorally of member 38. Latching pin 42 is slidable within the holes provided respectively in members 38 and 40 between a locking position (shown in FIG. 3) and an unlocked position in which pin 42 is displaced leftwardly as viewed in FIG. 3 so that end 42B thereof no longer projects beyond (to the right as viewed in FIG. 3) of the outer surface of member 38. Pin 42 is retained within members 38, 40 by the action of the coil spring and washer.

Referring to FIG. 3A, hinge means assembly 30 is seen to include a moveable hinge member 32 which, as described below, depends from a portion of seat assembly 12. As best seen with respect to identical moveable hinge member 32' the distal end of member 32 is curled over to define a cylindrical shaped tube 32A'. A hinge pin 34' is also provided. To assemble the hinge means assembly, the tube portion 32A' of moveable hinge member 32 is alligned between fixed hinge members 28A', 28B' which are spaced apart the width sufficient to receive the width of moveable member 32' therebetween. With the respective fixed and moveable tube members alligned pin 34 is inserted through 28A', 32A' and 28B'. A cotter pin or other locking device (not shown) may be provided at the end of pin 34' to lock it in place.

As seen in FIG. 3, a lock member 44 depends from the lower portion of seat assembly 12. Lock member 44 has an aperture 46 located adjacent the distal or lower end thereof which is bent slightly in a direction inwardly of frame 16 as viewed in FIG. 3. Lock member 44 is shown in partial view in FIG. 3A. Lock member 44 is positioned on seat assembly 12 so that it is aligned with latching means 36, more particularly, so that aperture 46 is aligned with end 42B of latching pin 42.

With hinge means assemblies 30 and 30' assembled in the manner described, seat assembly 12 is hinged on leg 20 of frame 14 for pivoting movement from a lowered, locked position on the frame to a raised, unlocked position which would permit access to portions of the motorcycle beneath frame 14. In the lowered locked position, which is the position in which the operator and any passenger would be seated on the seat while the motorcycle is being operated, the end 42B of latching pin 42 would be engaged within aperture 46 of lock member 44. The coil spring would bias pin 42 to maintain the locking engagement so that a positive secure locking is attained. When it is desired to unlock and raise the seat, head 42A of pin 42 may be employed to withdraw pin 42 leftwardly as viewed in FIG. 3 thereby disengaging end 42B of pin 42 from aperture 46 and releasing seat assembly 12 for upward pivoting movement about its, and the motorcycle's, longitudinal axis.

Figure 4:
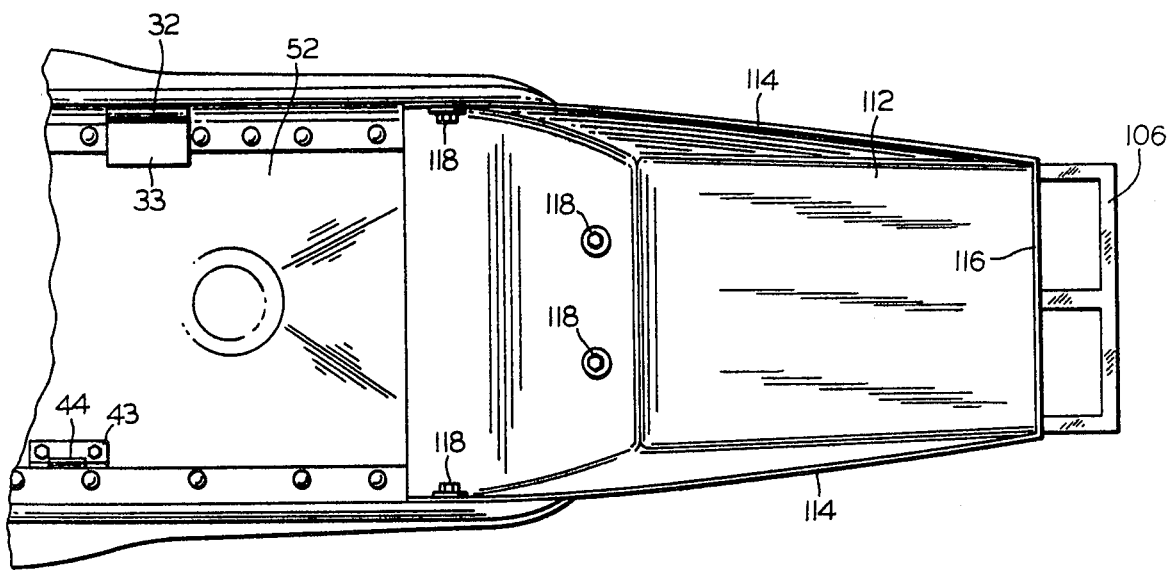
FIG. 4 is a partial bottom plan view of the seat assembly of FIGS. 1 and 3.
Figure 5:
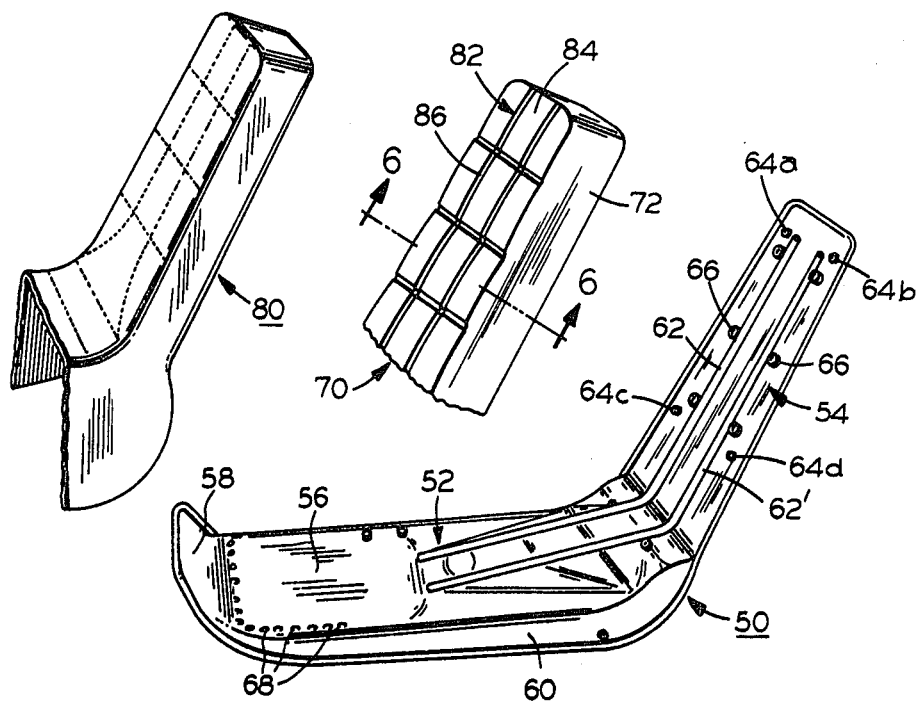
FIG. 5 is a partial exploded view of the seat assembly of FIGS. 1 and 3.

Referring now to FIG. 5, one of the major components of the seat assembly is the structural saddle generally indicated at 50. The saddle is preferably stamped from heavy gauge steel but it may obviously be made of any suitable material which provides sufficient rigidity and structural strength. In the embodiments shown, saddle 50 has a generally horizontally extending base 52 and a generally vertically extending back 54. Base 52, as may be best appreciated in FIGS. 3 and 4, is substantially saddle shaped being stamped to have a convex upper surface 56 and a flared front edge 58 and skirt sides 60. Saddle 50 has in side profile a shallow V configuration, one leg of which is defined by base 52 and the other by back 54. Back 52 is formed with a cupola type depression stamped therein to increase its structural strength.

A pair of stiffeners 62, 62' are bent in a generally L-shaped configuration and welded to saddle 50. One leg of each of stiffeners 62, 62' is welded or otherwise suitably secured to base 52 and the other legs of, respectively, stiffeners 62, 62' are similarly welded or otherwise secured to back 54. The stiffeners enhance the structural strength and rigidity of the structural saddle. Four bolts holes 64a, 64b, 64c, and 64d are formed in back 54 for a purpose to be described hereinafter. A plurality of large rivet holes 66 and small rivet holes 68 are formed in various locations along saddle 50 and are employed to fasten a seating pad and an outer cover over the seat assembly as described hereinafter.

Continuing with the description of FIG. 5, a seating pad 70 is shown in partial view in FIG. 5 with the base cushion broken away and back cushion 72 shown. The shape of seating pad 70 may be seen in FIG. 1, in which seating pad 70 is covered by a flexible fabric outer covering 80 which conforms entirely to the shape of seating pad 70. As thus shown in FIG. 1, seating pad 70, in addition to back cushion 72, has a base cushion generally indicated at 74. Base cushion 74 is of tiered construction having generally concave passenger section 76 and operator's section 78, separated by a convex hump 79. The dotted lead lines in FIG. 1 indicate that the portions identified are beneath outer covering 80.

Seating pad 70 is affixed to saddle 50 by any conventional suitable means, which may include expansion rivets through holes 66 etc.

As seen in FIG. 5, the upper surface of seating pad 70 contains a sculpted design 82 which, on back cushion 72, has the form of a tufted grid in which raised sections 84 are defined between a grid of rectangularly arranged channels 86. As seen in FIG. 1, a corresponding design is worked into outer covering 80 at the portion 88 thereof which overlies the upper surface of back cushion 72. Different designs are worked into the portion 88a, 88b, and 88c of outer cover 80, and the corresponding portions (not shown) of seating pad 70 have corresponding sculpted designs formed in the surface thereof.

Figure 6:
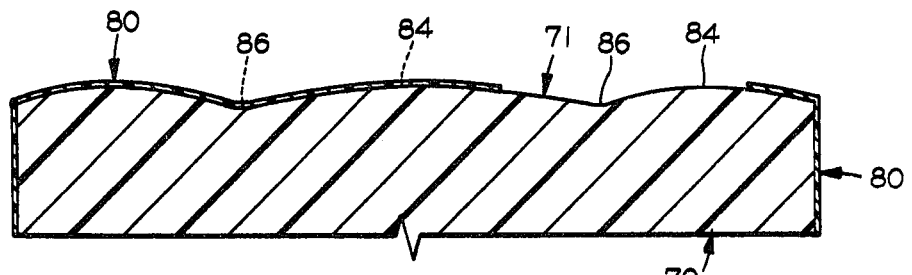
FIG. 6 is an enlarged, relative to the scale of FIG. 5, section view along section line 6—6 of FIG. 5, with a portion of the outer covering broken away.

FIG. 6 shows an enlarged cross sectional view along line 6—6 of a portion of FIG. 5. A portion of outer covering 80 is broken away and raised portion 84 and channels 86 formed in upper surface 71 of seating pad 70 are shown.

By sculpting into the upper surface of the seating pad the desired design, and forming (by stitching, embossing, heat forming or any suitable means) the corresponding design in outer covering 80, a deep sculpted effect is provided when outer covering 80 is assembled over seating pad 70.

Seating pad 70 may be formed of any suitable material. Generally, foamed synthetic organic polymeric materials such as foamed polyurethanes are preferred. The molding of such foamed polyurethane or other materials is well known in the art and the sculpted design may be formed by the provision of suitable inserts or mild design in a manner well known to the art so that the finished molded product has incorporated therein a sculpted design as desired on the upper surface thereof.

Figure 6A:
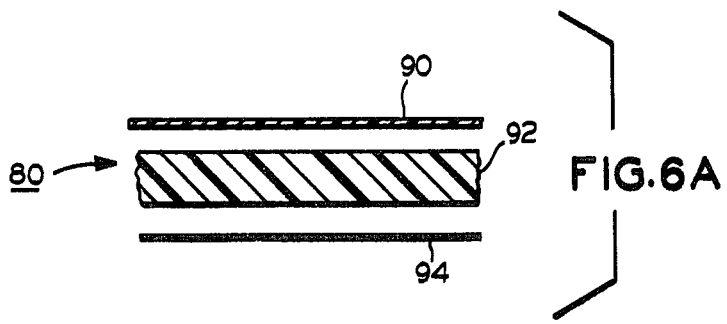
FIG. 6A is an exploded cross section view, greatly enlarged to the scale of FIG. 6, of the outer covering shown in FIG. 6.

Outer covering 80 may be of any suitable flexible material such as a vinyl or leather. A preferred construction of outer covering 80 is shown in FIG. 6A in which the cross sectional view of outer covering 80 of FIG. 6 has been greatly enlarged. An outer layer of leather or synthetic vinyl 90 is selected for qualities of appearance, wear resistance, and weatherability. An intermediate thin pad 92 of light flexible foamed material is sandwiched between outer layer 90 and a backing cloth 94. The three layers are joined together by stitching, adhesive, heat bonding or any other suitable way to form a unitary, thin flexible outer covering. While any suitable material may of course be employed for the outer covering, the composite type material illustrated is preferred. When a design is stitched, embossed or otherwise formed on the composite material, the texture and resiliency provided by the intermediate pad enhances the sculpted design effect.

As best seen in FIG. 5, outer covering 80 is preformed to provide a slipcover like fit over seating pad 70 and a design corresponding to the sculpted design on seating pad 70 is stitched or otherwise formed in the appropriate portions of outer covering 80.

After seating pad 70 is affixed to saddle 50, outer covering 80 is affixed over seating pad 70 so that the design preformed on outer covering 80 coincides with the sculpted design on the upper surface of seating pad 70. Outer covering is secured to seating pad 70 by conventional means which may include the use of adhesives. Outer covering 80 is further secured to structural saddle 60 by utilizing rivets and clamping bolts passed through appropriate eyelets formed in outer covering 80 and affixed through rivet holes 68.

Seat assembly 12 with seating pad 70 and outer covering 80 formed thereover provides a padded seat having a striking and attractive deep sculpted design thereover.

Referring now to FIGS. 1 and 3, a frame member 94 is seen to be affixed to the back or trailing surface of back 54 of saddle 50. Frame 94 comprises three curved bar members 96, 98, and 100 of generally L-shaped configuration connected to each other by cross bars 102 and 104 and end bar 106. Frame member 94 is of rigid heavy gauge steel construction. Mounting flanges 108a, 108b, 108c, and 108d extend inwardly from, respectively, outer bars 96 and 100 and are apertured to receive therein bolts which are employed to rigidly affix frame member 94 to back 54 of saddle 50 by the bolts being engaged with bolt holes 64a, 64b, 64c, and 64d respectively. As illustrated in FIG. 5, nuts are welded onto back 54 about bolt holes 64a, 64b, 64c, and 64d so the threaded hole in each nut coincides with its associated bolt hole. This facilitates connecting the bolts in the bolt holes with back cushion 72 and outer covering 80 already in place. In any event, bolts or other appropriate fastening means secure frame member 98 rigidly to saddle 50. Mounting bracket 108b and an adjacent portion of outer covering 80 is partially broken away in FIG. 3 to better show alignment of bolt hole 64a and its associated mounting flange 108b. As also shown in FIG. 5, stiffener means 62, 62' may comprise steel rods bent so that one portion of the length of each bent rod lies upon and is attached to (eg, by welding) base 52 of saddle 50, and a second portion of the length of each rod lies upon and is attached to back 54 of saddle 50. The plurality of bolt holes formed in back 54 of saddle 50 are disposed adjacent to and coextensive with at least a part of the second portion of the length of the rods whereby structural, saddle 50, stiffener means (rods) 62, 62' and frame member 98 define a rigid structural assembly.

The lower (as viewed in FIGS. 1 and 3) portion of frame member 94 is formed by the shorter side of bent bars 96, 98, and 100 to define a luggage rack generally indicated at 110 in FIG. 1. Frame member 94 is dimensioned so that the end thereof remote from luggage rack 110, i.e., the topmost portion thereof as viewed in FIG. 1, extends above the topmost portion of back 54 and seating pad 70. This extended end portion design of frame member 94 serves as a safety bar on the motorcycle. The luggage rack serves as a convenient repository for luggage, parcels and the like which may be secured to frame member 94 by suitable strap or other means.

The dimensions of frame member 94 are such that it does not interfere with the pivoting movement of seat assembly 12.

With reference to FIGS. 1, 3, and 4, a fairing 112 which may be formed of metal, plastic, or any other suitable material may be incorporated as part of seat assembly 12. Fairing 112 is of generally channel shaped design having opposed side walls 114 and an end wall 116. Bolts 118 secure fairing 112 to saddle 50, as seen in FIG. 4, to provide a finished appearance to the cycle as well as to provide a degree of cover and protection for the cycle components beneath it. Fairing 112 may obviously serve as a support for lights, turn signals, license plates, etc.

While the invention has been described in detail with reference to the specific illustrated embodiment, it will be apparent upon a consideration of the foregoing that numerous modifications may be made thereto without departing from the spirit and scope of the invention. The seat assembly of the invention is seen to provide a novel, simple and efficient structure by which a padded cycle seat may be provided with a deep sculpted attractive design in the surface thereof and further, the seat assembly may be pivotably mounted on the cycle frame yet be equiped with a safety bar and luggage rack combination which does not interfere with the pivoting movement. The pivoting movement between the locked lowered position illustrated in FIG. 1 and the unlocked raised position (not shown) provides access to the components of the cycle beneath the seat without the necessity of dismantling the seat and subsequently replacing it.

I claim:

1. A seat assembly for mounting a cycle frame comprising:
   A. a structural saddle having a horizontally extending base and a generally vertically extending back, the upper surface of said base defining a seat platform and the leading surface of said back defining a backrest platform and the trailing surface of said back defining a mounting platform;
   B. generally L-shaped stiffener means secured to and structurally reinforcing said base and said back of said saddle;
   C. hinge means mounted on said saddle on one side of the longitudinal centerline thereof and retaining means mounted on said saddle on the opposite side of said centerline from said hinge means, said hinge means and said retaining means cooperating to enable said saddle to be pivoted for movement between a locked lowered position and an unlocked raised position on said cycle frame;
   D. a generally L-shaped frame member having a generally vertically extending safety bar portion and a luggage rack portion extending generally horizontally from the lower end of said safety bar portion;
   E. means rigidly affixing said safety bar portion of said frame member to said mounting platform of said saddle back so that at least a portion of the length of said safety bar portion extends adjacent to said mounting platform of said saddle back, and said luggage rack portion extends rearwardly of said saddle back at a point spaced above the lower end thereof to provide clearance for the pivotal movement of said seat assembly between its lowered and raised positions;
   F. a seating pad cooperatively configured and mounted on said saddle, said seating pad having an upper surface and comprising a base cushion and a back cushion; and
   G. means affixing said seating pad to said saddle with said base cushion supported on said seating platform and said back cushion on said backrest platform.

2. The seat assembly of claim 1, wherein said seating pad comprises a foamed material, wherein said outer surface of said seating pad has a sculpted design formed in the foamed material thereof, and wherein said seat assembly further includes a flexible outer covering having formed therein a design conforming to said sculputed design in said seating pad and affixed over said seating pad so that said design in said flexible cover is aligned with said sculpted design in said seating pad.

3. The seat assembly of claim 2, wherein said flexible outer covering is a composite material comprising an outer wear surface fabric, a backing cloth, and a thin foamed material pad sandwiched between said fabric and said backing cloth.

4. The seat assembly of claim 1, wherein said safety bar portion extends above said back of said saddle.

5. The seat assembly of claim 4, wherein said frame member is of unitary construction and comprises a plurality of bars secured to each other by cross pieces, each of said bars being bent to define said L-shaped configuration.

6. The seat assembly of claim 5, wherein said frame member is comprised of steel bars welded together.

7. The seat assembly of claim 6, wherein said frame member further includes mounting flanges on said bars in said safety bar portion, said mounting flanges being secured to said structural saddle.

8. The seat assembly of claim 1, wherein said stiffener means comprises two stiffener means, one disposed on either side of the longitudinal centerline of said structural saddle.

9. The seat assembly of claim 1, wherein said stiffener means comprises steel rods bent into said generally L-shaped configuration so that one portion of the length of each bent rod lies upon and is attached to said base of said structural saddle, and a second portion of the length of each rod lies upon and is attached to said back of said structural saddle;
   wherein said frame member is of steel construction and includes mounting flanges on said safety bar portion thereof; and
   wherein said back of said structural saddle has a plurality of holes formed therein disposed adjacent to and coextensive with at least a part of said second portion of the length of said rods, said mounting flanges of said frame member having apertures therein aligned with said holes of said saddle back, and wherein fasteners extend through said aligned holes and apertures, whereby said structural saddle, said stiffener means and said frame member define a rigid structural assembly.

10. The seat assembly of claim 9 wherein said frame member is of welded steel construction and comprises a plurality of steel bars bent to define said substantially L-shaped configuration, said bent bars being interconnected by cross pieces.

11. The seat assembly of claim 9, wherein said seating pad has a sculpted design formed on said upper surface thereof and wherein said seat assembly includes a flexible outer covering of a composite material comprising an outer wear surface fabric, a backing cloth, and a thin foamed material pad sandwiched between said fabric and said backing cloth; said outer covering having formed the rein a design conforming to said sculpted design in said seating pad, and being disposed over and affixed over said seating pad so that said design in said outer covering is aligned with said sculpted design in said seating pad.

* * * * *